US 11,384,942 B2
United States Patent
Jang et al.

(10) Patent No.: US 11,384,942 B2
(45) Date of Patent: Jul. 12, 2022

(54) COGENERATION SYSTEM

(71) Applicant: LG ELECTRONICS INC., Seoul (KR)

(72) Inventors: Heejoong Jang, Seoul (KR); Song Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 170 days.

(21) Appl. No.: 16/707,048

(22) Filed: Dec. 9, 2019

(65) Prior Publication Data

US 2020/0182487 A1    Jun. 11, 2020

(30) Foreign Application Priority Data

Dec. 10, 2018 (KR) .................. 10-2018-0157774

(51) Int. Cl.
| F24D 11/00 | (2022.01) |
| F02M 26/22 | (2016.01) |
| F02M 26/09 | (2016.01) |
| F02M 26/19 | (2016.01) |
| F02M 26/34 | (2016.01) |

(52) U.S. Cl.
CPC ........... *F24D 11/005* (2013.01); *F02M 26/09* (2016.02); *F02M 26/19* (2016.02); *F02M 26/22* (2016.02); *F02M 26/34* (2016.02)

(58) Field of Classification Search
CPC ...... F24D 11/005; F02M 26/09; F02M 26/19; F02M 26/22; F02M 26/34
USPC .................................................... 123/568.15
See application file for complete search history.

(56) References Cited

U.S. PATENT DOCUMENTS

| 2,485,503 | A  | * | 10/1949 | Misch ................... F02D 9/00 123/561 |
| 7,784,286 | B2 | * | 8/2010  | Bolis .................... F01K 21/047 60/39.53 |
| 2002/0157414 | A1 | * | 10/2002 | Iwanami ............... B60H 1/323 165/254 |
| 2004/0173192 | A1 | * | 9/2004  | Sorter ................... F02M 26/19 123/568.18 |
| 2013/0047616 | A1 | * | 2/2013  | Holmes ................ F24D 11/009 60/670 |

(Continued)

FOREIGN PATENT DOCUMENTS

| EP | 3 343 754 | 7/2018 |
| EP | 3 604 759 | 2/2020 |

(Continued)

OTHER PUBLICATIONS

European Search Report dated Feb. 17, 2020 issued in Application No. 19214743.7.

*Primary Examiner* — Logan M Kraft
*Assistant Examiner* — John D Bailey
(74) *Attorney, Agent, or Firm* — Ked & Associates LLP

(57) ABSTRACT

A cogeneration system includes an intake pipe having one end which communicates with the outside air and having the other end which is connected to an engine; a mixer disposed in the intake pipe to supply gas into the intake pipe; and an intake compressor for compressing a mixed gas which is a mixture of the air and the gas, wherein the intake compressor includes: a motor disposed in the intake pipe; and a compressor impeller which is disposed in the intake pipe, and rotates by the motor to compress the mixed gas.

17 Claims, 8 Drawing Sheets

(56) References Cited

U.S. PATENT DOCUMENTS

| | | | | |
|---|---|---|---|---|
| 2013/0232972 A1* | 9/2013 | Heiermann | ............ | F02M 26/24 |
| | | | | 60/605.2 |
| 2019/0003379 A1* | 1/2019 | Kemmerling | ........... | F02B 37/04 |
| 2019/0063351 A1* | 2/2019 | Zeng | ................... | F02D 41/0007 |

FOREIGN PATENT DOCUMENTS

| | | |
|---|---|---|
| JP | 2006-307648 | 11/2006 |
| JP | 3897588 | 3/2007 |
| JP | 2013-148062 | 8/2013 |
| WO | WO 2009/087274 | 7/2009 |

\* cited by examiner

COGENERATION SYSTEM

The present application claims priority to Korean Application No. 10-2018-0157774, filed in Korea on Dec. 10, 2018, the entire contents of which is incorporated herein for all purposes by this reference.

BACKGROUND OF THE INVENTION

1. Field of the Invention

The present invention relates to a cogeneration system, and more particularly, to a cogeneration system for improving efficiency and stability, reducing harmful substances in exhaust gas, and changing a refrigerant flow according to condensation/evaporation of the refrigerant.

2. Description of the Related Art

The gradual depletion of fossil fuels, which is the most widely used energy source, has led to the interest in alternative energy that can be continuously renewed by using infinite natural energy such as the sun, wind, waves, biological organisms and their waste. Further, most of all, clean energy causing little pollution unlike fossil fuels that have been used before is required. In particular, as the environmental problems such as environmental pollution and climate change conventions became social concerns in the 1990s, the importance of these has become even more important.

Among the alternative energy projects, the power generation project using landfill gas (LFG) is the most applied field of landfill gas energy conversion projects. The composition of landfill gas, which is the raw material of such a system, is mainly composed of 45-60% methane (CH4), 35-40% carbon dioxide (CO2), and trace amounts of N2, O2. Since landfill gas has a heating value of about 4,500 to 5,500 kcal/m3 based on 50% of methane content, it is the most important material of landfill gas recycling project and used as the fuel of gas engine driving.

Gas engines using landfill gas may be classified into a dedicated engine and a dual fuel engine. Since the dual fuel engine uses the existing diesel engine intactly, the retrofit is easy and the flammable limit is wide, so that stable operation can be achieved even with changes in fuel composition. The dedicated engine has an advantage in that only gas is used as fuel, but it has difficulty in operating in a place where gas component is severely changed because the heating value of fuel must be somewhat high and the gas component must be uniform. In order to maximize the fuel conversion efficiency of the engine in the operating range in which combustion stability is ensured, precise control of each component according to the characteristics of the fuel-air mixture is required.

In particular, when the concentration of the gaseous fuel is lean, there is a problem that power generation is difficult due to poor ignition, and in the case of the gas, when the combustion is performed by a natural aspirated engine, there is a limit in improving the output due to the low supply pressure.

In order to solve the shortcomings of the natural aspirated engine, the prior art includes a compressor connected to the shaft of the engine by a belt, so that intake pressure of the engine can be enhanced, and the efficiency of the engine can be improved.

However, when the compressor is connected to the engine by a belt as in the prior art, there is problem of noise and large space occupancy, and there is disadvantage that the compression ratio of the compressor cannot be precisely controlled due to the connection to the shaft of the engine by the belt.

SUMMARY OF THE INVENTION

The present invention has been made in view of the above problems, and provides a cogeneration system having improved stability while improving the output of an engine.

The present invention further provides a cogeneration system for reducing the volume of a product, and preventing the leakage of a mixed gas, by configuring a gas supply unit for supplying mixed gas and an intake compressor for compressing the gas supply unit mixed gas as a single module.

The present invention further provides a cogeneration system for using a motor-type intake compressor which allows precise compression ratio control and preventing the mixed gas from burning when an electric leakage occurs in an electric line controlling a motor.

The present invention further provides a cogeneration system for disposing a gas supply unit for mixing gas and air in between the motor and the impeller of the intake compressor.

The present invention further provides a cogeneration system for disposing a gas supply unit for mixing gas and air in between the motor and the impeller of the intake compressor, and disposing the motor in the upper stream from which air flows.

In accordance with an aspect of the present invention, a cogeneration system includes: an air intake pipe through which air is introduced, a gas intake pipe into which gas is introduced, a mixed gas intake pipe which is connected to the air intake pipe and the gas intake pipe and supplies a mixed gas of air and gas to an engine, a gas supply unit for mixing the gas supplied from the gas intake pipe with air in the air intake pipe, and an intake compressor for compressing the mixed gas, and the intake compressor includes a motor disposed in the intake pipe, and a compressor impeller which is disposed in the intake pipe, and rotates by the motor to compress the mixed gas.

The gas supply unit is disposed between the motor and the compressor impeller in the intake pipe.

The gas supply unit includes an acceleration unit for reducing a cross-sectional area of the air intake pipe while progressing toward the compressor impeller from the motor, and a spray unit which has a smaller cross-sectional area than the acceleration unit, and is provided with a spray hole connected to the gas intake pipe.

The spray unit is disposed closer to the compressor impeller than the acceleration unit.

The cogeneration system further includes a shaft connecting the motor and the compressor impeller, and the spray unit and the acceleration unit are disposed to surround the shaft.

The compressor impeller includes a first compressor impeller connected to the motor by a shaft, a second compressor impeller, and a clutch for connecting or disconnecting power of the first compressor impeller to the second compressor impeller.

The cogeneration system further includes a cooler for cooling the mixed gas compressed in the intake compressor In accordance with another aspect of the present invention, a cogeneration system includes an intake pipe having one end which communicates with the outside air and having the other end which is connected to an engine, a gas supply unit disposed in the intake pipe to supply gas into the intake pipe, and an intake compressor for compressing a mixed gas which is a mixture of the air and the gas, wherein the intake compressor includes a motor disposed in the intake pipe; and a compressor impeller which is disposed in the intake pipe, and rotates by the motor to compress the mixed gas, wherein the gas supply unit is positioned between the motor and the compressor impeller.

The motor is disposed upstream of the gas supply unit.

The gas supply unit is disposed between the motor and the compressor impeller in the intake pipe.

The intake pipe includes: a motor accommodating part in which the motor is disposed; a gas supply unit accommodating part in which the gas supply unit is disposed; and an impeller accommodating part in which the compressor impeller is positioned.

The gas supply unit accommodating part is positioned between the motor accommodating part and the impeller accommodating part.

The gas supply unit includes: an acceleration unit for reducing a cross-sectional area of the gas supply unit accommodating part while progressing toward the compressor impeller from the motor; and a spray unit which has a smaller cross-sectional area than the acceleration unit, and is provided with a spray hole connected to the gas intake pipe.

The spray unit is disposed closer to the compressor impeller than the acceleration unit.

The cogeneration system further includes a shaft connecting the motor and the compressor impeller, and the spray unit and the acceleration unit are disposed to surround the shaft.

The compressor impeller includes: a first compressor impeller connected to the motor by a shaft; a second compressor impeller; and a clutch for connecting or disconnecting power of the first compressor impeller to the second compressor impeller.

The cogeneration system further includes a cooler for cooling the mixed gas compressed in the intake compressor, and the cooler is positioned in the intake pipe between the engine and the compressor impeller.

The cogeneration system further includes a generator for generating power by a power of the engine.

The cogeneration system further includes a hot water storage tank for storing heat medium recovering heat generated by the engine.

The first compressor impeller is disposed closer to the motor than the second compressor impeller, and the gas supply unit is positioned between the first compressor impeller and the motor.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
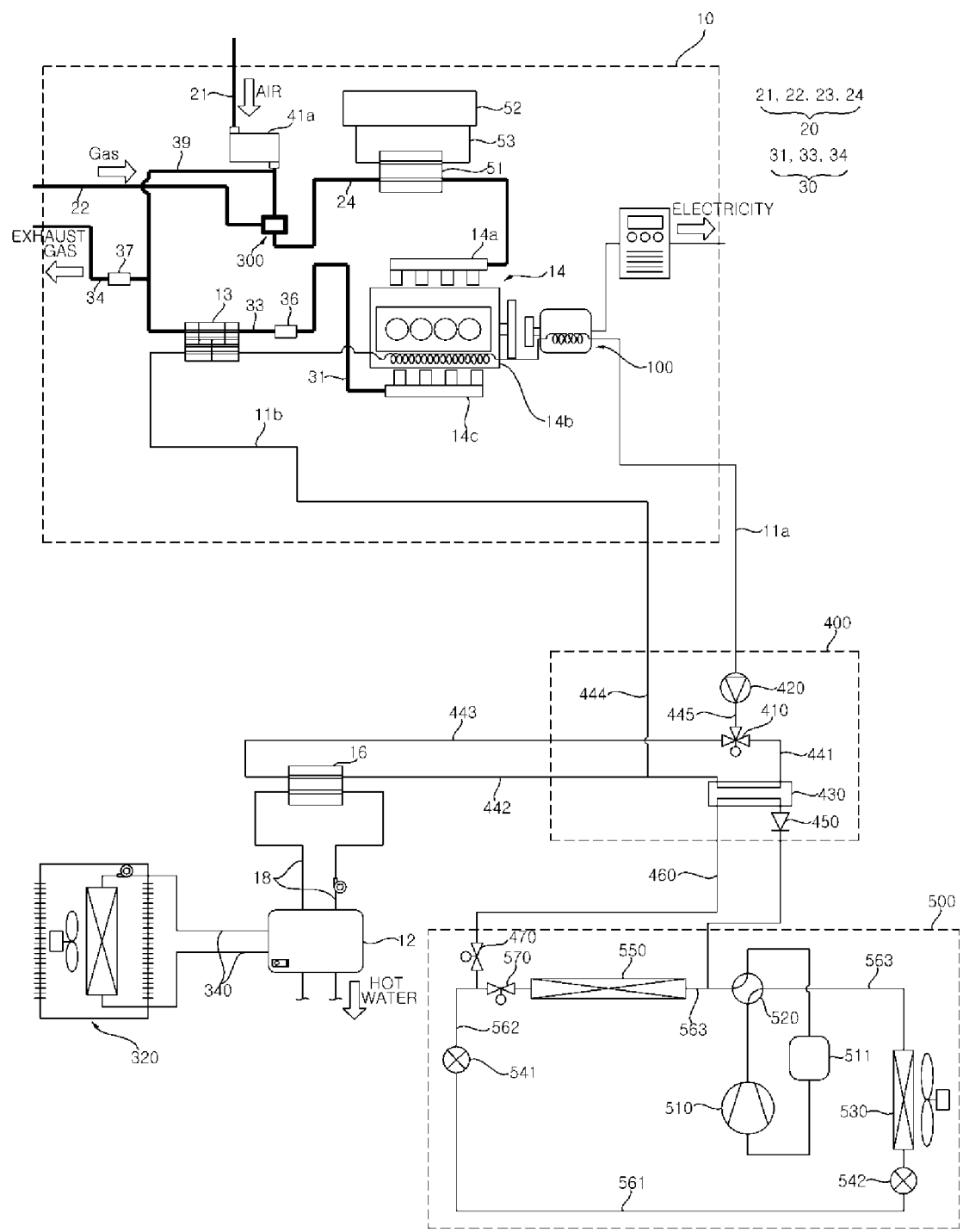
FIG. 1 is a schematic diagram of a cogeneration system according to an embodiment of the present invention.

FIG. 1 is a schematic diagram of a cogeneration system according to an embodiment of the present invention.

Referring to FIG. 1, the cogeneration system of the present embodiment generates power may include a power generation unit 10 for generating power and dissipating heat generated during power generation, an air conditioner for cooling and heating indoor air, a hot water storage tank 12, a distribution unit 400 for guiding the heat of the power generation unit 10 to any one of the air conditioner and the hot water storage tank 12. Part of the power generated by the power generation unit 10 may be supplied to the air conditioner.

The power generation unit 10 may generate power and heat, supply the generated power to lighting or home appliances, which is power consumption devices, and transfer the generated heat to the hot water storage tank 12 or the air conditioner.

The power generation unit 10 may include an engine 14, a generator 100 connected to the engine 14 to generate power, a hot water supply heat exchanger 16 connected to the hot water storage tank 12 through a hot water supply circulation flow path 18, and a heat medium flow path 11 which recovers at least one heat of the engine 14 and the generator 100 and transfers the recovered heat to the hot water supply heat exchanger 16.

In addition, the power generation unit 10 may include an intake pipe 20 through which a gas mixed with air flows in, a gas supply unit 340 which is disposed in the intake pipe and supplies gas into the intake pipe, an intake compressor 301 for compressing a mixed gas supplied to the intake pipe 20, an exhaust pipe 30 which is connected to the engine 14 and exhausts an exhaust gas, a return pipe 39 for recirculating a part of the exhaust gas flowing into the exhaust pipe 30 to the intake pipe 20, and a catalyst module 36 for oxidizing/deoxidizing harmful components in the exhaust gas to be harmless.

The engine 14 is connected to the intake pipe 20 and the exhaust pipe 30 to generate power due to the combustion of the mixed gas. The mixed gas supplied to the engine 14 through the intake pipe 20 is discharged as exhaust gas through the exhaust pipe 30 after combustion in the engine 14.

The engine 14 may include a cylinder head 14b in which the mixed gas is combusted, an intake manifold 14a for flowing the mixed gas into the cylinder head 14b, and an exhaust manifold 14c for flowing the combusted exhaust gas to the exhaust pipe 30.

A gas mixed with the air flows into the intake pipe 20. The intake pipe 20 intakes air and gas to mix air and gas, and then supplies them to the intake compressor 301 and the engine 14. The gas may include various combustible materials, and preferably, include landfill gas.

The intake pipe 20 is connected to outside air, a gas storage (not shown), the intake manifold 14a of the engine 14, and the intake compressor 301.

For example, the intake pipe 20 includes an air intake pipe 21 into which air is introduced, a gas intake pipe 22 into which gas is introduced, and a mixed gas intake pipe 24 for supplying air supplied from the air intake pipe 21 and the mixed gas supplied from the gas intake pipe 22 to engine 14.

The air intake pipe 21 flows air. One end of the air intake pipe 21 is connected to the outside air and the other end is connected to the gas intake pipe 22 and the mixed gas intake pipe 24. An air filter 41a for purifying the intaken air, a silencer 41, and the like may be disposed in the air intake pipe 21.

Gas flows in the gas intake pipe 22. One end of the gas intake pipe 22 is connected to the gas storage and the other end is connected to the air intake pipe 21.

The gas supply unit 340 is disposed in the intake pipe 20 to mix air and gas at an appropriate ratio, and provides the mixed gas to the mixed gas intake pipe 24. The gas supply unit 340 may be connected to the gas intake pipe 22 and the air intake pipe 21. Specifically, the gas supply unit 340 may allow the gas to be naturally dispersed in the air due to the pressure difference between the gas intake pipe 22 and the air intake pipe 21. More specifically, the gas supply unit 340 may be an spray hole 342a which communicates with the gas intake pipe 22, and is disposed in the air intake pipe 21.

The mixed gas intake pipe 24 provides the mixed gas mixed by the gas supply unit 340 to the intake manifold 14a of the engine 14. One end of the mixed gas intake pipe 24 is connected to the air intake pipe 21, and the other end is connected to the intake manifold 14a of the engine 14.

The embodiment may further include a generator 100 which is connected to an output shaft of the engine 14 and generates power when the output shaft rotates, and supplies the generated power through a power line.

A heat medium that recovered the heat of a driving source of the power generator 100 passes through the heat medium flow path 11. The heat medium flow path 11 transfers the heat of the engine or the generator 100 to a cooling cycle of the air conditioner or the hot water supply circulation flow path 18 of the hot water storage tank 12 through the heat medium. For example, a heat recovery unit (not shown) for recovering heat of the engine 14 or the generator 100 may be disposed in the heat medium flow path 11. Obviously, the heat medium flow path 11 may recover the heat of the engine 14, the generator 100, and the exhaust pipe.

Specifically, the heat medium flow path 11 may include an engine, a heat medium outflow path 11b through which the heat medium that heat exchanged with the generator 100 flows out, and a heat medium inflow path 11a through which the heat medium discharged from the distribution unit 400 flows back into the engine and the generator 100. Here, water may be used as the heat medium.

The hot water supply heat exchanger 16 heat-exchanges between the heat medium circulating the heat medium flow path 11 and the heat medium circulating the hot water supply circulation flow path 18. The hot water supply heat exchanger 16 transfers the thermal energy of the heat medium flow path 11 to the hot water supply circulation flow path 18. A second refrigerant flows in the hot water supply circulation flow path 18.

In addition, the power generation unit 10 may further include a heat dissipation unit 32 which is connected to the hot water storage tank 12 through a heat dissipation flow path 34 and dissipates the heat of water in the hot water storage tank 12. The water in the hot water storage tank 12 is provided to a place which requires hot water, but is cooled by the heat dissipation unit 32 and used as the cooling water of the hot water supply heat exchanger 16.

The intake compressor 301 compresses the mixed gas supplied to the intake pipe 20 and provides to the engine 14.

Hereinafter, a cooling cycle of an air conditioner constituting a part of the cogeneration system of the present embodiment will be described.

The cooling cycle of the present embodiment includes a compressor 510, an expansion mechanism, an outdoor heat exchanger 550, and an indoor heat exchanger 530.

The compressor 510 compresses the refrigerant and endows a circulation force so that the refrigerant can circulate a cooling cycle. Meanwhile, in the present embodiment, it may be connected to the generator 100 by a power line to receive power from the generator 100. In addition, an accumulator 511 for accumulating liquid refrigerant is connected to an inlet pipe through which the refrigerant of the compressor 510 flows in.

The expansion mechanism expands the refrigerant, before the refrigerant is evaporated while passing through the heat exchanger, and is formed of an electronic expansion valve such as EEV. A single expansion mechanism may be provided to be able to expand the refrigerant in the cooling operation and the heating operation respectively.

However, the present embodiment may include a first expansion valve 541 which expands the refrigerant introduced into the outdoor heat exchanger 550 during the heating operation, and a second expansion valve 542 which expands the refrigerant introduced into the indoor heat exchanger 530 during the cooling operation.

Meanwhile, the cooling cycle of the present invention further includes an outdoor heat exchanger 550, an indoor heat exchanger 530, a compressor 510, and a four-way valve 520 connected between expansion devices so as to change the flow of the refrigerant according to the cooling and heating.

In the outdoor heat exchanger 550, the refrigerant flows and is condensed/evaporated while exchanging heat with outdoor air blown by a blower (not shown). Furthermore, in the present embodiment, defrosting may be achieved by absorbing the heat of the heat medium flowing through the heat medium flow path 11 described above.

In the indoor heat exchanger 530, the refrigerant flows and is condensed/evaporated while exchanging heat with indoor air blown by the blower (not shown).

The distribution unit 400 controls the direction of the refrigerant flowed through the heat medium flow path 11. The distribution unit 400 allows the heat medium flowing through the heat medium flow path 11 to heat exchange with a first refrigerant of the air conditioner among the hot water storage tank 12 and the air conditioner during the defrosting operation or the heating operation, and allows the heat medium flowing through the heat medium flow path 11 to heat exchange with a second refrigerant of the hot water storage tank 12 among the hot water storage tank 12 and the air conditioner during the cooling operation.

Specifically, the distribution unit 400 allows the heat medium flowing through the heat medium flow path 11 to heat exchange with the first refrigerant flowing through a refrigerant cycle of the air conditioner, during the defrosting operation or the heating operation, and allows the heat medium flowing through the heat medium flow path 11 to heat exchange with the second refrigerant flowing through the hot water circulation flow path 18 during the cooling operation.

For example, the distribution unit 400 includes an air conditioning heat exchanger 430 for exchanging heat of the heat medium and the first refrigerant, and a three-way valve 410 for guiding the heat medium passed through the driving source of the generator 100 to the hot water supply heat exchanger 16 of the hot water storage tank 12 during the cooling operation, and guiding the heat medium passed through the driving source of the generator 100 to the air conditioning heat exchanger 430 during the defrosting operation or the heating operation. The distribution unit 400 may include a plurality of distribution pipes.

A pump 420 for compressing the heat medium may be further disposed in the heat medium flow path 11b. The heat medium compressed by the pump 420 is supplied to the three-way valve 410. The pump 420 and the three-way valve 410 are connected by a fifth distribution pipe 445.

The three-way valve 410 is connected to the heat medium outflow path 11b, the air conditioning heat exchanger 430, and the hot water supply heat exchanger 16. The three-way valve 410 is connected to the pump 420, the air conditioning heat exchanger 430, and the hot water supply heat exchanger 16.

The three-way valve 410 and the air conditioning heat exchanger 430 are connected by a first distribution pipe 441, the air conditioning heat exchanger 430 and the hot water supply heat exchanger 16 are connected by a second distribution pipe 442, and the hot water supply heat exchanger 16 and the three-way valve 410 are connected by a third distribution pipe 443. The second distribution pipe 442 and the heat medium flow path 11 are connected by a fourth distribution pipe 444. Specifically, the fourth distribution pipe 444 connects the heat medium inflow path 11a and the second distribution pipe 442.

The air conditioning heat exchanger 430 exchanges heat between the heat medium flowing through the first distribution pipe 441 and the first refrigerant bypassed in the cooling cycle.

The distribution unit 400 further includes a bypass pipe 460. The bypass pipe 460 bypasses the outdoor heat exchanger 550 of the air conditioner and guides the expanded refrigerant to the air conditioning heat exchanger 430, during the defrosting operation or the heating operation.

The air conditioning heat exchanger 430 is connected to the bypass pipe 460. The air conditioning heat exchanger 430 exchanges heat between the heat medium flowing through the first distribution pipe 441 and the first refrigerant flowing through the bypass pipe 460.

One end of the bypass pipe 460 is connected between the expansion device of the air conditioner and the outdoor heat exchanger 550, and the other end of the bypass pipe 460 is connected between the outdoor heat exchanger 550 and the compressor 510 of the air conditioner. Specifically, one end of the bypass pipe 460 is connected to an outdoor unit inlet pipe 562 connecting the first expansion valve 541 of the air conditioner, and the other end of the bypass pipe 460 is connected to an outdoor unit outlet pipe 563 connecting the outdoor heat exchanger 550 and the four-way valve 520.

The bypass pipe 460 may further include an intermittent valve 470 that is closed during the cooling operation, and is opened during the defrosting operation or the heating operation. The intermittent valve 470 is opened during the defrosting operation or the heating operation so that the first refrigerant expanded in the first expansion valve 541 flows to the air conditioning heat exchanger 430 through the bypass pipe 460. The intermittent valve 470 is closed during the cooling operation so that the refrigerant expanded in the first expansion valve 541 cannot flow into the bypass pipe 460 but flows to the outdoor heat exchanger 550. The intermittent valve 470 is disposed between the air conditioning heat exchanger 430 and the outdoor unit inlet pipe 562 in the bypass pipe 460.

In addition, the bypass pipe 460 may further include a check valve 450 that restricts the inflow of the first refrigerant evaporated from the outdoor heat exchanger 550 of the air conditioner into the air conditioning heat exchanger 430 during the cooling operation. The check valve 450 passes the first refrigerant passed through the air conditioning heat exchanger 430 during the heating operation or the defrosting operation. Therefore, the first refrigerant passed through the check valve 450 flows to the refrigerant cycle. The check valve 450 is disposed between the air conditioning heat exchanger 430 and the outdoor unit outlet pipe 563 in the bypass pipe 460.

The outdoor unit inlet pipe 562 may further include an adjustment valve 570 that is opened during the cooling operation or the heating operation, and is closed during the defrosting operation. The adjustment valve 570 is opened during the cooling operation or the heating operation to allow the first refrigerant expanded in the first expansion valve 541 to flow into the outdoor heat exchanger 550, and is closed during the defrosting operation to prevent the first refrigerant expanded in the first expansion valve from flowing to the outdoor heat exchanger 550. The adjustment valve 570 is disposed between a connection point of the bypass pipe 460 and the outdoor heat exchanger 550 in the outdoor inlet pipe.

The distribution unit 400 is preferably positioned in a separate cabinet from the driving source of the generator 100.

The distribution unit 400 may further include a controller for controlling the three-way valve 410 and an air conditioner described later.

The controller controls the three-way valve 410 to guides the heat medium passed through the driving source of the generator 100 to the hot water supply heat exchanger 16 of the hot water storage tank 12 during the cooling operation and the heating operation, and guide the heat medium passed through the driving source of the generator 100 to the air conditioning heat exchanger 430 during the defrosting operation or the heating operation.

In addition, the controller (not shown) determines whether to perform the defrosting operation by determining the condition to be implanted in the outdoor heat exchanger 550 during the heating operation. The controller may determine the defrost condition based on the outdoor temperature, or the like.

Accordingly, since the embodiment evaporates the expanded refrigerant of the air conditioner by using the waste heat of the engine or the generator 100 absorbed by the heat medium during the defrosting operation, and supplies the refrigerant to the outdoor heat exchanger 550, there is an advantage that a heating operation can be performed even when the outdoor heat exchanger 550 is landed, and an advantage of transferring the waste heat of the engine or generator 100 absorbed by the heat medium during the cooling operation to the hot water storage tank 12.

Hereinafter, the compressor module 300 including the intake compressor 301 and the gas supply unit 340 will be described in detail with reference to FIG. 2.

Figure 2:
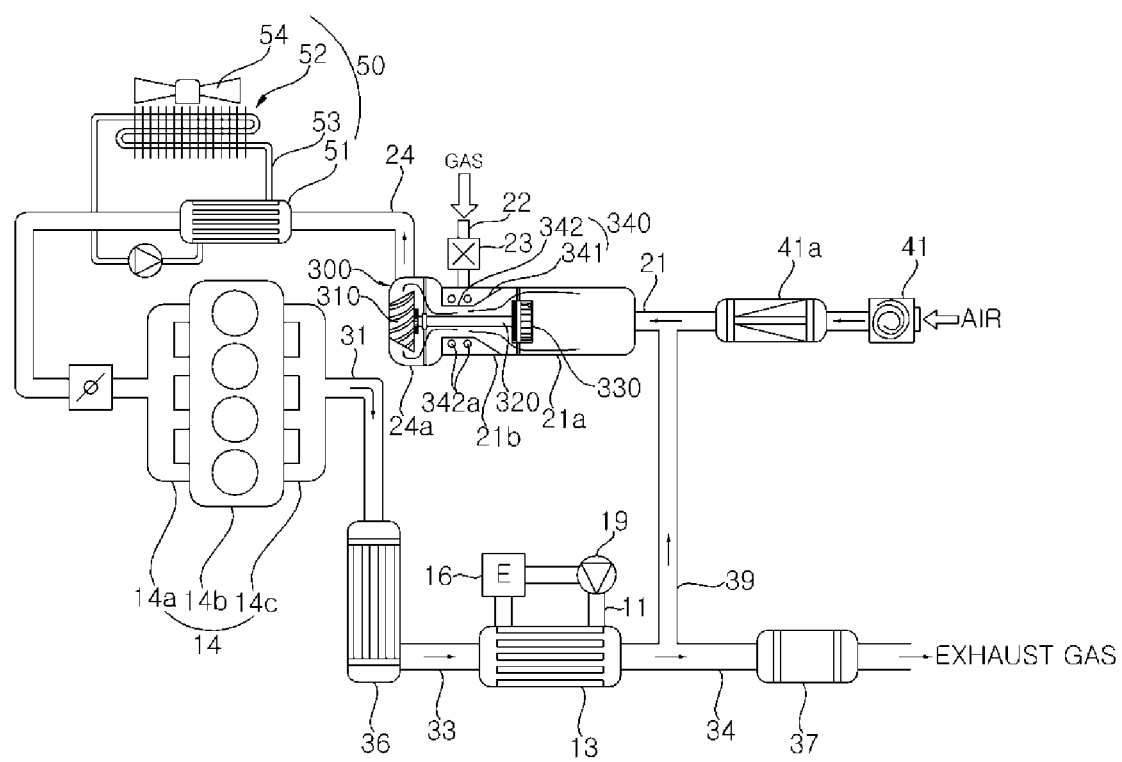
FIG. 2 is a diagram illustrating a part of a power generation unit of the cogeneration system of FIG. 1.

FIG. 2 is a diagram illustrating a part of a power generation unit of the cogeneration system of FIG. 1.

In the intake compressor 301 using a motor 330, since the motor 330 uses electricity, there is a problem that the mixed gas is combusted when a spark occurs in the motor 330 and an electric line connected to the motor 330. In order to solve this problem, if air is compressed through the intake compressor 301 before the gas is mixed, the pressure of air becomes high, and thus the gas becomes difficult to be mixed due to the pressure difference. In this case, there is a problem that a separate compressor is required because the gas must be pressurized separately.

In addition, the gas supply unit 340 is disposed in the air intake pipe 21, and thus if the gas supply unit 340 is disposed elsewhere, there is a problem that the pipe is extended, and must be disposed before the intake compressor 301 in order to mix the gas.

In order to solve the above-described problems and reduce a space occupied by the gas supply unit 340, the present invention implemented the intake compressor 301 and the gas supply unit 340 as a single module.

The intake compressor 301 compresses the mixed gas flowing through the mixed gas intake pipe 24 with a constant pressure. The intake compressor 301 may be operated by a separate power source.

Specifically, the intake compressor 301 may include a motor 330, a compressor impeller 310, and a shaft 320.

The motor 330 generates power by electric energy. The motor 330 is disposed in the intake pipe 20. Since the electric line is connected to the motor 330, in order to prevent combustion of the mixed gas, the motor 330 may be disposed in the air intake pipe 21 in which the mixed gas does not flow.

The compressor impeller 310 is rotated by the motor 330 to compress and discharge the intake mixed gas. The compressor impeller 310 is axially connected to the motor 330 by a shaft 320. The compressor impeller 310 is disposed in the intake pipe.

Specifically, the compressor impeller 310 may be disposed in the mixed gas intake pipe 24 through which the mixed gas flows. The compressor impeller 310 sucks and compresses a mixed gas in which the air of the air intake pipe 21 and the gas of the gas intake pipe 22 are mixed, and discharges the mixed gas to the mixed gas intake pipe 24 connected to the engine. The mixed gas intake pipe 24 may be an area positioned downstream from the gas supply unit 340 or/and the gas intake pipe 22 of the intake pipe 20.

When the compressor impeller 310 is disposed in the mixed gas intake pipe 24, the fuel can be stably supplied without a separate fuel pressurizing apparatus and a regulator, and the gas in the gas intake pipe 22 can be stably sucked.

The shaft 320 is extended along the longitudinal direction of the intake pipe 20. The motor 330 and the compressor impeller 310 are rotated about the shaft 320. The shaft 320 spaces the motor 330 from the compressor impeller 310.

The gas supply unit 340 is disposed between the motor 330 and the compressor impeller 310 in the air intake pipe 21. The motor 330 is disposed upstream of the gas supply unit 340, and the gas supply unit 340 is disposed upstream of the compressor impeller 310. Here, the upstream means the upstream side based on the flow direction of the air or the mixed gas. In addition, the upstream means a portion relatively adjacent to a portion communicating with the outside air in the intake pipe 20.

When the gas supply unit 340 is disposed between the motor 330 and the compressor impeller 310 in the air intake pipe 21, the motor 330 is disposed upstream of the gas supply unit 340, so that gas is not mixed in the air flowing around the motor 330. Thus, there is no risk that the mixed gas is combusted due to the spark of the motor 330 and the electric line connected to the motor 330.

In addition, since the gas supply unit 340 is disposed upstream of the compressor impeller 310 to mix air and gas before being compressed by the intake compressor 301, the gas can be naturally mixed without compressing the gas.

The gas supply unit 340 may have a structure in which gas is dispersed into the air due to a pressure difference between the gas intake pipe 22 and the air intake pipe 21 without a separate energy source. The gas supply unit 340 may have a structure that lowers the pressure of the air intake pipe 21 than the gas intake pipe 22.

For example, the gas supply unit 340 may include an acceleration unit 341 and a spray unit 342. The acceleration unit 341 lowers the compression by accelerating the air in the air intake pipe 21. The acceleration unit 341 has a structure in which the cross-sectional area of the air intake pipe 21 is reduced as it progresses toward the compressor impeller 310 from the motor 330.

The acceleration unit 341 may protrude from the inner surface of the air intake pipe 21 toward the center of the air intake pipe 21. Here, the cross-sectional area of the air intake pipe 21 means the internal area of the air intake pipe 21, based on the cross section that crosses the longitudinal direction of the air intake pipe 21.

Specifically, the acceleration unit 341 may have a ring shape, and may have a structure in which an inner diameter decreases while progressing toward the compressor impeller 310 from the motor 330. Alternatively, the acceleration unit 341 may be disposed above and below the air intake pipe 21, and may have a structure of being inclined upward while progressing toward the compressor impeller 310 from the motor 330.

The spray unit 342 is a place where the gas of the gas intake pipe 22 flows into the air intake pipe 21 by the pressure of the air which passed the acceleration unit 341. The spray unit 342 may maintain the speed of the air accelerated in the acceleration unit 341.

In detail, the spray unit 342 may have a cross-sectional area smaller than the average cross-sectional area of the acceleration unit 341, or may have a cross-sectional area equal to the minimum cross-sectional area of the acceleration unit 341. Here, the cross-sectional area of the spray unit 342 means the internal area of the air intake pipe 21 excluding the spray unit 342, on the cross section that crosses the longitudinal direction of the air intake pipe 21, and the cross-sectional area of the acceleration unit 341 means an inner area of the air intake pipe 21 excluding the acceleration unit 341, on the cross section that crosses the longitudinal direction of the air intake pipe 21.

More specifically, the cross-sectional area of the spray unit 342 may be uniform along the longitudinal direction of the air intake pipe 21 or may be reduced, but it is preferable that the cross-sectional area of the spray unit 342 is uniform so as to uniformly suck the gas from the gas intake pipe 22.

For example, the spray unit 342 may have a ring shape having a constant internal diameter, or may be a bar disposed above and below the air intake pipe 21. Preferably, the spray unit 342 and the acceleration unit 341 have a ring shape disposed to surround the shaft 320.

The spray unit 342 may be provided with a spray hole 342a connected to the gas intake pipe. The spray hole 342a sprays gas from the spray unit 342 toward a center of gas supply unit accommodating part 21b. The spray hole 342a may be formed to be penetrated at the spray unit 342. The spray unit 342 is disposed downstream of the acceleration unit 341. That is, the spray unit 342 is disposed closer to the compressor impeller 310 than the acceleration unit 341.

In other words, the compressor module 300 may include the gas supply unit 340 and a compressor housing 21a, 21b, 24a in which the intake compressor 301 is disposed. The compressor housing 21a, 21b, 24a may form part of the intake pipe and may define a separate space.

The compressor housing 21a, 21b, 24a may include a motor accommodating part 21a in which the motor 330 is disposed, a gas supply unit accommodating part 21b in which the gas supply unit 340 is disposed, and an impeller accommodating part 24a in which the compressor impeller 310 is positioned. The gas supply unit accommodating part 21b is positioned between the motor accommodating part 21a and the impeller accommodating part 24a. The motor accommodating part 21a is disposed upstream of the gas supply unit accommodating part 21b. The shaft 320 penetrates through the gas supply unit accommodating part 21b to connect the motor 330 and the compressor impeller 310.

One end of the motor accommodating part 21a is connected to the air intake pipe 21, and the other end of the motor accommodating part 21a is connected to the gas supply unit accommodating part 21b. One end of the gas supply unit accommodating part 21b is connected to the motor accommodating part 21a, and the other end of the gas supply unit accommodating part 21b is connected to the impeller accommodating part 24a. The gas intake pipe 22 is connected to the gas supply unit accommodating part 21b. The suction side of the impeller accommodating part 24a is connected to the gas supply unit accommodating part 21b, and the discharge side of the impeller accommodating part 24a is connected to the engine 14.

The air sucked into the motor accommodating part 21a is accelerated in the gas supply unit accommodating part 21b and mixed with the gas. The mixed gas of the gas supply unit accommodating part 21b is compressed and discharged from the impeller accommodating part 24a. The impeller accommodating part 24a may be connected to a cooler 50. The discharge side of the impeller accommodating part 24a is connected to the mixed gas intake pipe 24. Specifically, the impeller accommodating part 24a is connected to the intake manifold 14a of the engine 14 by the mixed gas intake pipe 24.

Here, the gas supply unit 340 may include an acceleration unit 341 which reduces the cross-sectional area of the gas supply unit accommodating part 21b while progressing toward the compressor impeller 310 from the motor 330, and a spray unit 342 having a smaller cross-sectional area than the acceleration unit 341 and having a spray hole 342a connected to the gas intake pipe.

The present invention includes the intake compressor 301 that compresses the mixed gas, and supplies the mixed gas to the engine 14, thereby improving the power generation output and improving the efficiency. Further, since the mixed gas is compressed through the intake compressor 301 in the state where the air and the gas are mixed, there is an advantage in that the power generation output is improved while stably supplying fuel without a separate fuel pressurizing device and a regulator.

When the intake compressor 301 is used, the temperature and pressure of the mixed gas flowing to the engine 14 become very high. Thus, there is a risk of explosion when such a high temperature and pressure mixed gas flows out to the outside, and the amount of gas becomes relatively smaller when flowing to the engine 14, so that the output may be reduced.

Therefore, the embodiment may further include a cooler 50 for cooling the mixed gas compressed by the intake compressor 301. The cooler 50 cools the mixed gas compressed by the intake compressor 301 and provides the mixed gas to the engine 14.

The cooler 50 may be disposed between the engine 14 and the compressor impeller 310 in the mixed gas intake pipe 24. In detail, the cooler 50 may include a radiator 52 for exchanging heat between the refrigerant and an outside air, an internal heat exchanger 51 for exchanging heat between the mixed gas flowing through the mixed gas intake pipe 24 and the refrigerant, and a circulation flow path 53 which refrigerant flows therein and circulates between the internal heat exchanger 51 and the radiator 52. The radiator 52 may further include a fan 54 that provides air flow to the radiator 52.

When the mixed gas compressed by the cooler 50 is cooled, the temperature of the mixed gas is lowered and the volume is reduced. Thus, there is an advantage in that the power generation efficiency can be improved by increasing the amount of fuel supplied to the engine 14, and explosion can be prevented when the mixed gas is leaked.

When the exhaust gas is discharged through the exhaust pipe 30, air pollution is generated due to harmful substances such as nitrogen oxides.

The return pipe 39 supplies a part of the exhaust gas discharged through the exhaust pipe 30 back to the engine 14 so that uncombusted combustion products are re-combusted in the engine and the amount of exhaust gas discharged through the exhaust pipe 30 is reduced. Therefore, the combustion efficiency and reliability of the engine are improved, and volatile organic compounds discharged through the exhaust gas can be reduced.

Specifically, the return pipe 39 recirculates a part of the exhaust gas flowing into the exhaust pipe 30 to the intake pipe 20. The return pipe 39 recirculates the exhaust gas by the pressure difference from the exhaust pipe 30 which has a relatively high pressure due to the exhaust pressure of the engine to the intake pipe 20 which has the same pressure as the outside air.

When the exhaust gas is re-circulated to the intake pipe 20 due to the pressure difference, there is an advantage in that a separate compressor 510, a controller for control, or the like is unnecessary.

The catalyst module 36 oxidizes/deoxidizes harmful components in the exhaust gas to be harmless. The catalyst module 36 is an apparatus that is disposed in the exhaust pipe 30, and oxidizes/deoxidizes harmful CO (carbon monoxide), HC (hydrocarbon), and NOX (nitrogen oxide) in the exhaust gas passing through the catalyst module 36 into carbon dioxide (CO2), H2O (water), and N2 (nitrogen) which are harmless to the human body.

The catalyst module 36 has a pellet type and a monolith type in terms of a structure, and has two types of an oxidation catalytic converter and a three-way catalytic converter in terms of function.

First, the oxidation catalytic converter finely and evenly coats (deposit) a precious metal of palladium (Pd) or palladium+platinum (Pt), which catalyzes the surface of granular alumina called catalytic pellets, on wash and serves to make carbon monoxide and hydrocarbon in the exhaust gas into carbon dioxide and water.

The three-way catalytic converter uses precious metal, such as platinum+rhodium (Rh) or platinum+rhodium+palladium, which performs catalysis, and serves to reduce carbon monoxide, hydrocarbons, and nitrogen oxides in the exhaust gas. Three-way catalytic converter is currently the most used because it has a high efficiency of over 98% at high temperature.

A part of the exhaust gas which passed through the catalyst module 36 is re-circulated to the intake pipe 20 through the return pipe 39. Therefore, the catalyst module 36 primarily reduces harmful substances in the exhaust gas, and secondly, reduces the amount of the exhaust gas by the return pipe 39 to reduce the discharge amount of harmful substances.

The embodiment may further include an exhaust gas heat exchanger 13 for cooling the exhaust gas. The exhaust gas heat exchanger 13 radiates heat of the exhaust gas to lower the temperature of the exhaust gas provided to the return pipe 39.

Therefore, when the temperature of the exhaust gas is lowered by the exhaust gas heat exchanger 13, there is an advantage in that the temperature of the mixed gas in the intake pipe 20 is increased by the exhaust gas re-circulated to the intake pipe 20 to prevent spontaneous combustion.

For example, as shown in FIG. 2, the exhaust gas heat exchanger 13 may radiate heat of the exhaust gas while transferring heat of the exhaust gas to the hot water storage tank 12. Specifically, the exhaust gas heat exchanger 13 is disposed in the heat medium flow path 11 and the exhaust pipe 30. The heat of the exhaust gas is transferred to the hot water supply heat exchanger 16 through the heat medium flow path 11, and the heat transferred to the hot water supply heat exchanger 16 is transferred to the hot water storage tank 12 through the hot water circulation flow path 18.

Therefore, when the exhaust gas heat exchanger 13 is connected to the heat medium flow path 11, the heat of the exhaust gas can be reused to heat the hot water storage tank 12 without wasting heat by dissipating heat to the outside.

For another example, although not shown in the drawing, the exhaust gas heat exchanger 13 may have a structure for exchanging heat between the outside air and the exhaust gas through a heat transfer medium.

A part of the exhaust gas that passed through the catalyst module 36 and the exhaust gas heat exchanger 13 is re-circulated to the intake pipe 20 through the return pipe 39 due to the pressure difference between the exhaust pipe 30 and the intake pipe 20.

Thus, the return pipe 39 is disposed downstream of the catalyst module 36 and the exhaust gas heat exchanger 13 in the exhaust pipe 30.

The exhaust pipe 30 may include a first exhaust pipe 31 connecting the engine and the catalyst module 36, a second exhaust pipe 33 connecting the catalyst module 36 and the exhaust gas heat exchanger 13, and a third exhaust pipe 34 connecting the exhaust gas heat exchanger 13 and the outside air. One end of the return pipe 39 is connected to the third exhaust pipe 34 to remove harmful components, and the exhaust gas having a lowered temperature is re-circulated to the intake pipe 20, and the re-circulated exhaust gas is provided to the engine 14.

The other end of the return pipe 39 may be connected upstream of the intake compressor 301 in the intake pipe 20. Therefore, the exhaust gas re-circulated through the return pipe 39 may be compressed with the gas and the air and supplied to the engine 14. More specifically, the other end of the return pipe 39 is preferably connected to the air intake pipe 21. That is, the other end of the return pipe 39 is connected between the gas supply unit 340 and the air filter 41*a* in the air intake pipe 21.

The exhaust pipe 30 may be provided with a sound reduction box 37 to reduce the exhaust noise. The sound reduction box 37 may be positioned downstream from the catalyst module 36, the exhaust gas heat exchanger 13, and a branch point of the return piping 39 in the exhaust pipe 30. Specifically, the sound reduction box 37 may be disposed in the third exhaust pipe 34.

Figure 3:
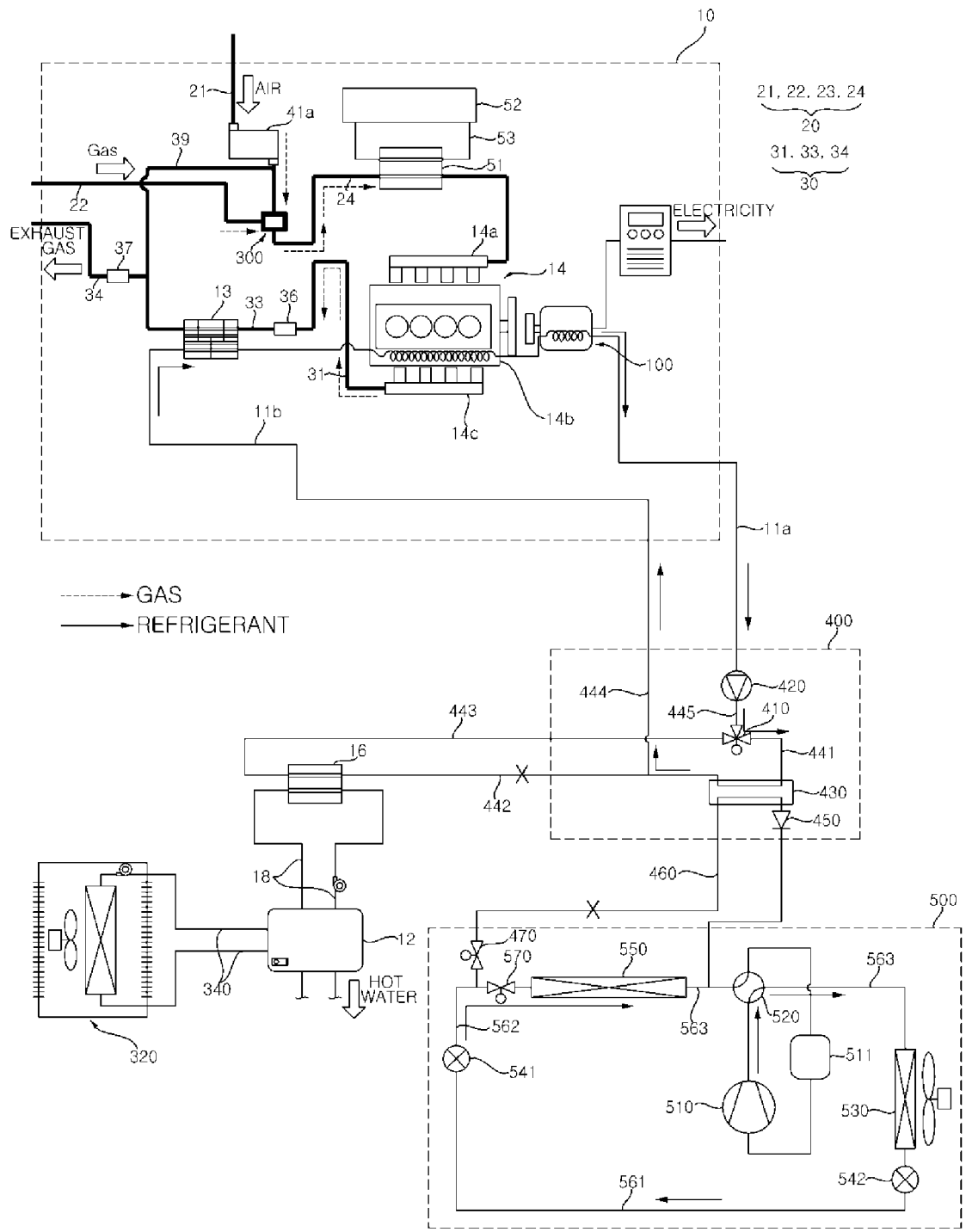
FIG. 3 is a diagram illustrating the flow of a heat medium and a refrigerant during a heating operation of the cogeneration system of FIG. 1.

FIG. 3 is a diagram illustrating the flow of a heat medium and a refrigerant during a heating operation of the cogeneration system of FIG. 1.

Referring to FIG. 3, first, the circulation process of the heat medium will be described.

The heat medium absorbs waste heat while passing through the engine and the generator 100, and is supplied to the distribution unit 400 through the heat medium flow path 11*b*.

The heat medium supplied to the distribution unit 400 passes through the hot water supply heat exchanger 16 or the air conditioning heat exchanger 430 according to the operation state by the distribution unit 400, and flows back into the power generation unit 10 through the heat medium inflow path 11*a*. The heat medium introduced through the heat medium inflow path 11*a* is circulated back to the engine and the generator 100, and absorbs waste heat.

Specifically, the heat medium supplied to the distribution unit 400 is pressurized by the pump 420 and flows into the three-way valve 410 during the heating operation, and the heat medium introduced into the three-way valve 410 is introduced into the air conditioning heat exchanger 430 through the first distribution pipe 441. However, since the first refrigerant is not supplied to the air conditioning heat exchanger 430, heat exchange does not occur between the heat medium and the first refrigerant. The heat medium passed through the air conditioning heat exchanger 430 passes through the fourth distribution pipe 444 and flows into the heat medium inflow path 11*a*.

For another example, the heat medium supplied to the distribution unit 400 is pressurized by the pump 420 and flows into the three-way valve 410 during the heating operation, and the heat medium introduced into the three-way valve 410 is introduced into the hot water supply heat exchanger 16 through the third distribution pipe 443. The heat medium supplied to the hot water supply heat exchanger 16 may exchange heat with the second refrigerant in the hot water circulation flow path 18, and supply heat to the hot water storage tank 12.

Hereinafter, the circulation process of the first refrigerant of the cooling cycle of the air conditioner will be described.

In the heating operation, the outdoor heat exchanger 550 serves as an evaporator, and the indoor heat exchanger 530 serves as a condenser.

The first refrigerant of high temperature and high pressure discharged from the compressor 510 is introduced into the indoor heat exchanger 530 via the four-way valve 520.

The first refrigerant introduced into the indoor heat exchanger 530 is condensed by exchanging heat with the indoor air. The condensed first refrigerant is throttled by the first expansion valve 141.

The controller 200 controls to close the intermittent valve 470 and to open the adjustment valve 570.

The first refrigerant passed through the first expansion valve 141 cannot flow into the bypass pipe 460 as the intermittent valve 470, 153 is closed, but flows into the outdoor heat exchanger 550 to be evaporated.

The first refrigerant passed through the outdoor heat exchanger 550 flows into the accumulator via the four-way valve 520. The first refrigerant introduced into the accumulator from the four-way valve 520 flows into the compressor 510.

Figure 4:
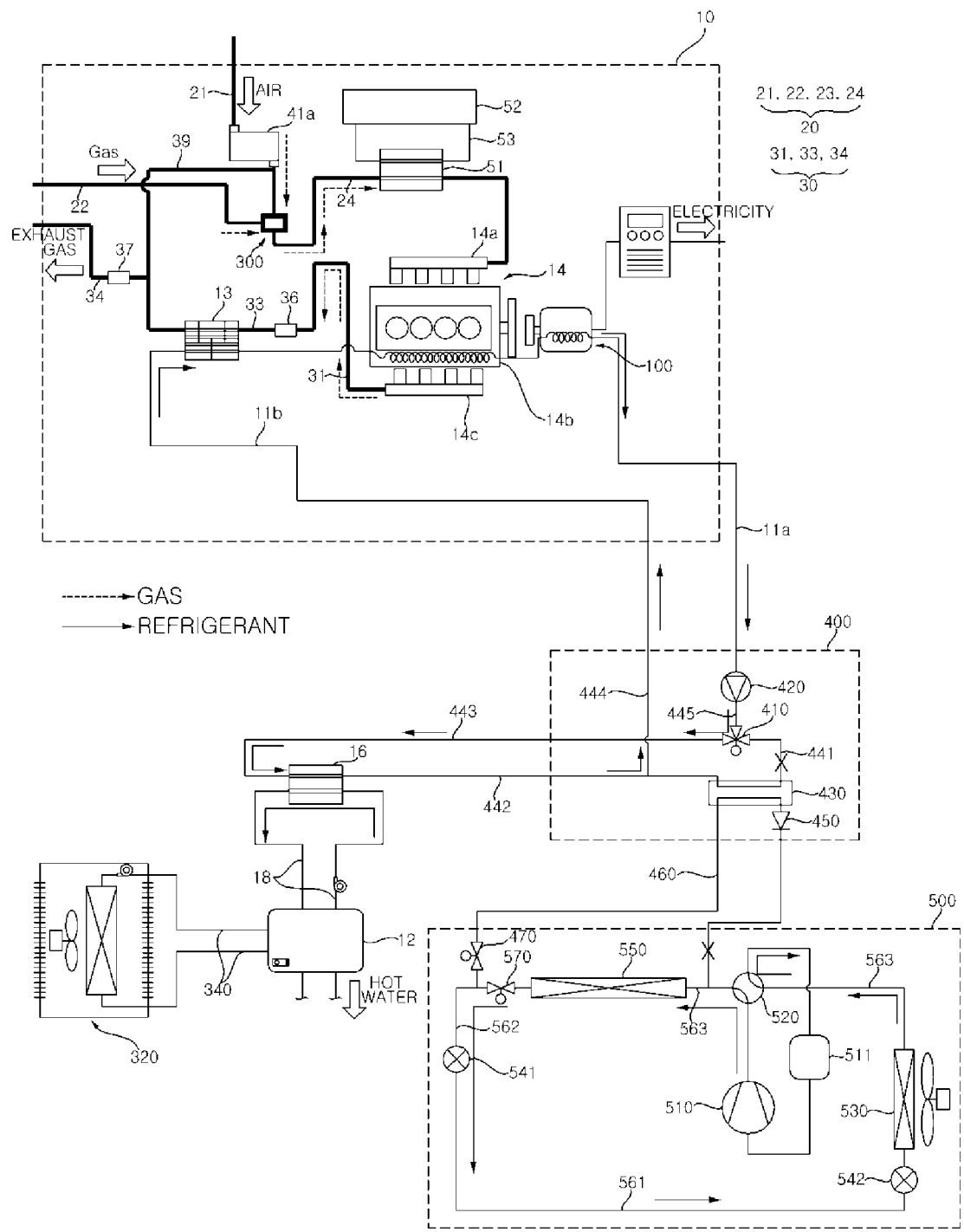
FIG. 4 is a diagram illustrating the flow of a heat medium and a refrigerant during a cooling operation of the cogeneration system of FIG. 1.

FIG. 4 is a diagram illustrating the flow of a heat medium and a refrigerant during a cooling operation of the cogeneration system of FIG. 1.

Referring to FIG. 4, the heat medium supplied to the distribution unit 400 is pressurized by the pump 420 and flows into the three-way valve 410 during the cooling operation, and the heat medium introduced into the three-way valve 410 flows into the hot water supply heat exchanger 16 through the third distribution pipe 443. The heat medium supplied to the hot water supply heat exchanger 16 may exchange heat with the second refrigerant in the hot water circulation flow path 18, and supply heat to the hot water storage tank 12.

Hereinafter, the circulation process of the first refrigerant of the cooling cycle of the air conditioner will be described.

In the cooling operation, the outdoor heat exchanger 550 serves as a condenser and the indoor heat exchanger 530 serves as an evaporator.

The first refrigerant of high temperature and high pressure discharged from the compressor 510 is introduced into the outdoor heat exchanger 550 via the four-way valve 520.

The first refrigerant introduced into the outdoor heat exchanger 550 is condensed by exchanging heat with outdoor air. The condensed first refrigerant is throttled in the second expansion valve 542.

The controller 200 controls to close the intermittent valve 470 and to open the adjustment valve 570.

The refrigerant flowing from the four-way valve 520 to the outdoor heat exchanger 550 has a limit in flowing into the bypass pipe 460 due to the check valve 450.

The first refrigerant passed through the outdoor heat exchanger 550 flows into the indoor heat exchanger 530. The first refrigerant introduced into the indoor heat exchanger 530 is evaporated while exchanging heat with the indoor air.

The first refrigerant introduced into the indoor heat exchanger 530 flows into the accumulator via the four-way valve 520. The first refrigerant introduced into the accumulator from the four-way valve 520 flows into the compressor 510.

Figure 5:
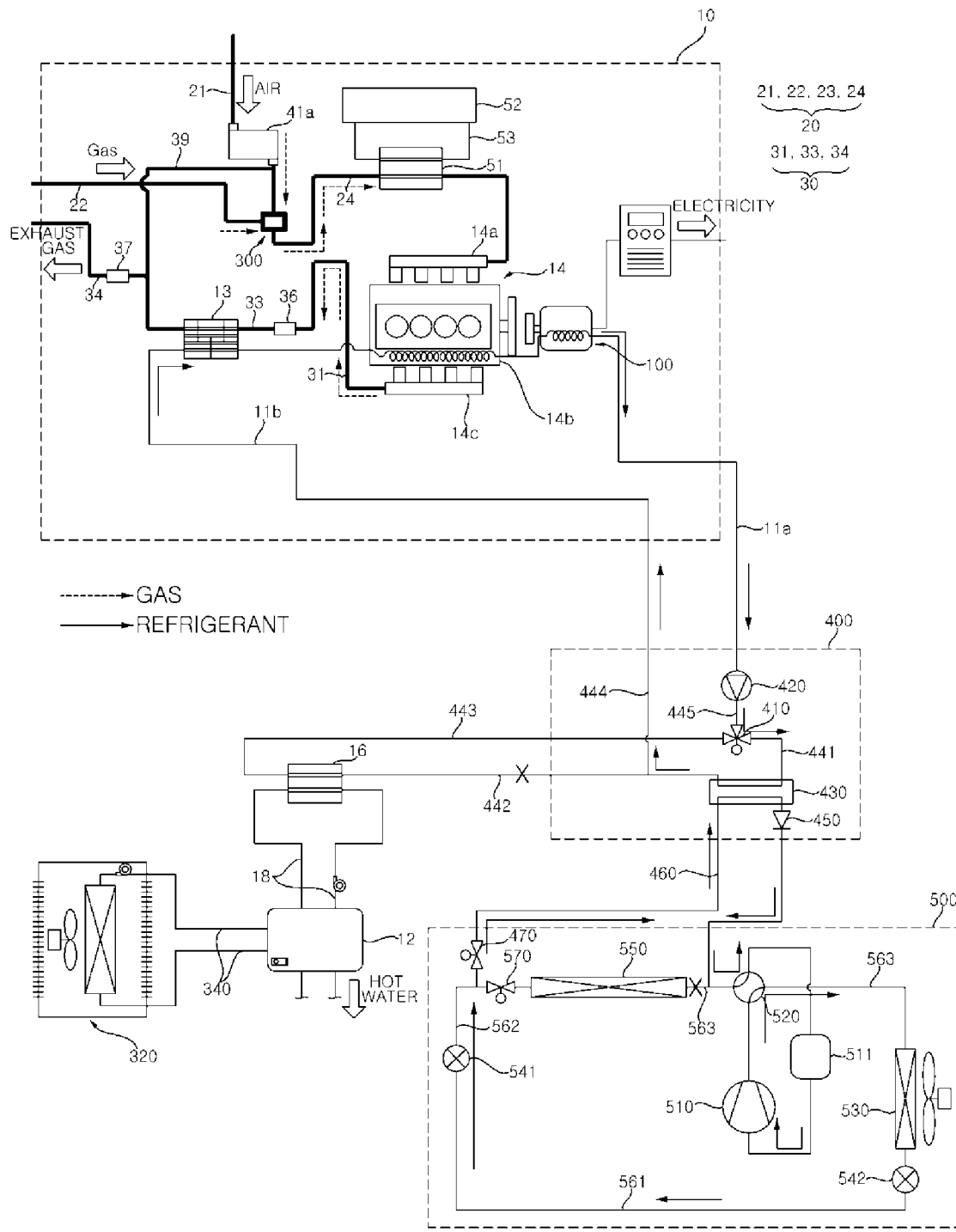
FIG. 5 is a diagram illustrating the flow of a heat medium and a refrigerant during a defrost operation of the cogeneration system of FIG. 1.

FIG. 5 is a diagram illustrating the flow of a heat medium and a refrigerant during a defrost operation of the cogeneration system of FIG. 1.

Referring to FIG. 5, the heat medium supplied to the distribution unit 400 is pressurized by the pump 420 and flows into the three-way valve 410 during the heating operation, and the heat medium introduced into the three-way valve 410 is introduced into the air conditioning heat exchanger 430 through the first distribution pipe 441. The heat medium supplied to the air conditioning heat exchanger 430 exchanges heat with the first refrigerant flowing through the bypass pipe 460. The heat medium supplied to the air conditioning heat exchanger 430 transfers heat to the first refrigerant flowing through the bypass pipe 460.

At this time, the air conditioning heat exchanger 430 serves as an evaporator.

Hereinafter, the circulation process of the first refrigerant of the cooling cycle of the air conditioner will be described.

In the defrosting operation, the air conditioning heat exchanger 430 serves as an evaporator, and the indoor heat exchanger 530 serves as a condenser.

The first refrigerant of high temperature and high pressure discharged from the compressor 510 is introduced into the indoor heat exchanger 530 via the four-way valve 520.

The first refrigerant introduced into the indoor heat exchanger 530 is condensed by exchanging heat with the indoor air. The condensed first refrigerant is throttled by the first expansion valve 141.

The controller 200 controls to open the intermittent valve 470 and to close the adjustment valve 570.

The first refrigerant passed through the first expansion valve 141 flows into the bypass pipe 460 as the intermittent valve 470, 153 is opened, and does not flow into the outdoor heat exchanger 550.

The first refrigerant supplied to the bypass pipe 460 is evaporated by heat exchange with the heat medium in the air conditioning heat exchanger 430.

The first refrigerant passed through the air conditioning heat exchanger is introduced into the accumulator via the four-way valve 520. The first refrigerant introduced into the accumulator from the four-way valve 520 flows into the compressor 510.

Therefore, even if the frost is generated in the outdoor heat exchanger 550, heat operation can be performed using the waste heat of the engine or generator 100.

Figure 6:
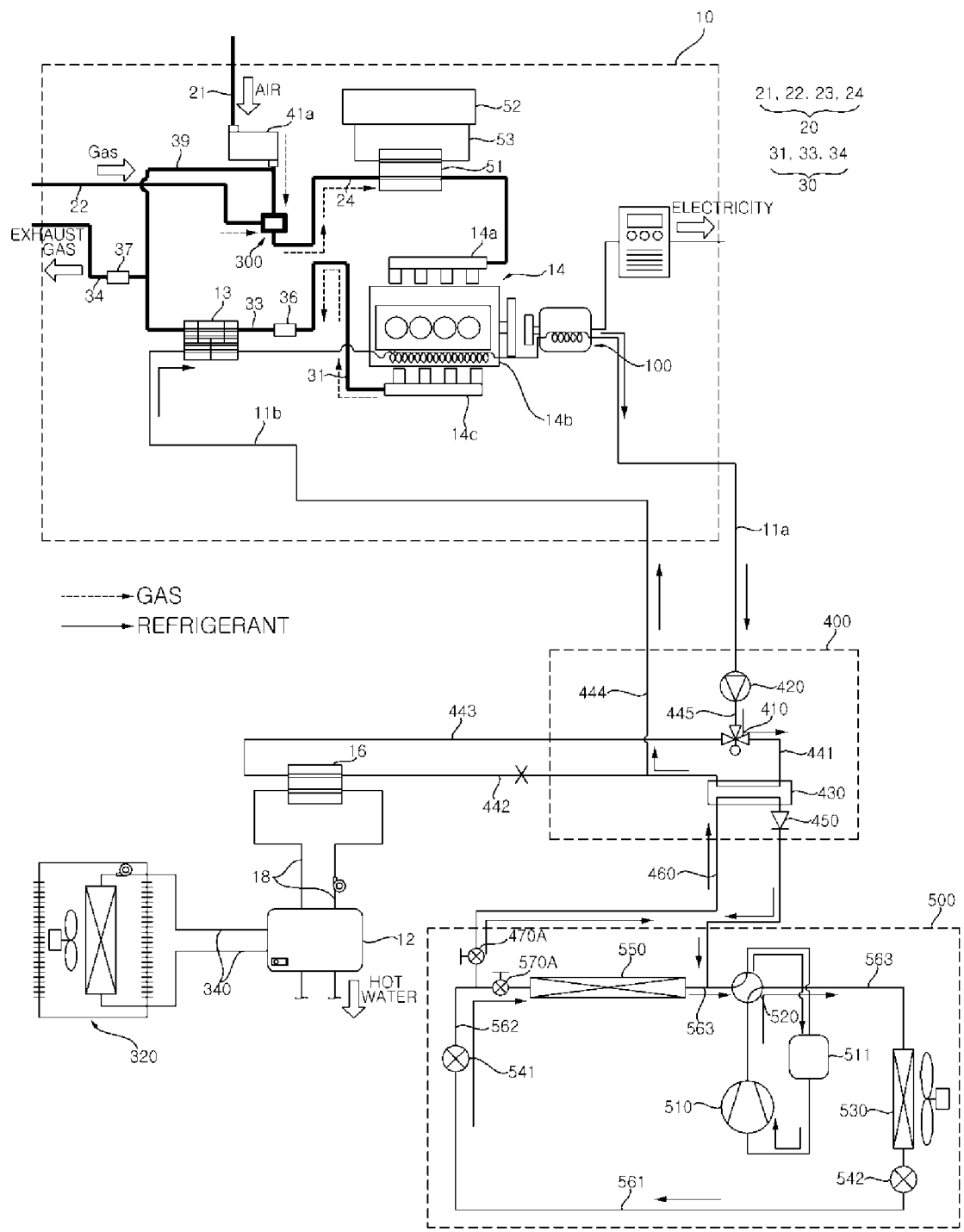
FIG. 6 is a diagram illustrating the flow of a heat medium and a refrigerant during a defrost operation of a cogeneration system according to another embodiment of the present invention.

FIG. 6 is a diagram illustrating the flow of a heat medium and a refrigerant during a defrost operation of a cogeneration system according to another embodiment of the present invention.

FIG. 6 is different from FIG. 5 in that the intermittent valve and the adjustment valve are changed to a first flow control valve 470a and a second flow control valve 570a, respectively.

The first flow control valve 470a and the second flow control valve 570a may adjust flow rates of the heat medium and the first refrigerant flowing through the bypass pipe and an outdoor unit inlet pipe. When the first flow control valve 470a and the second flow control valve 570a control the flow rate, the amount of the inflow of the first refrigerant expanded in the first expansion valve into the air conditioning heat exchanger and/or the outdoor heat exchanger may be adjusted within a range where the outdoor heat exchanger is not frosted.

The first refrigerant expanded in the first expansion valve may flow into the air conditioning heat exchanger and/or the outdoor heat exchanger according to the opening degree of the first flow control valve 470a and the second flow control valve 570a.

Figure 7:
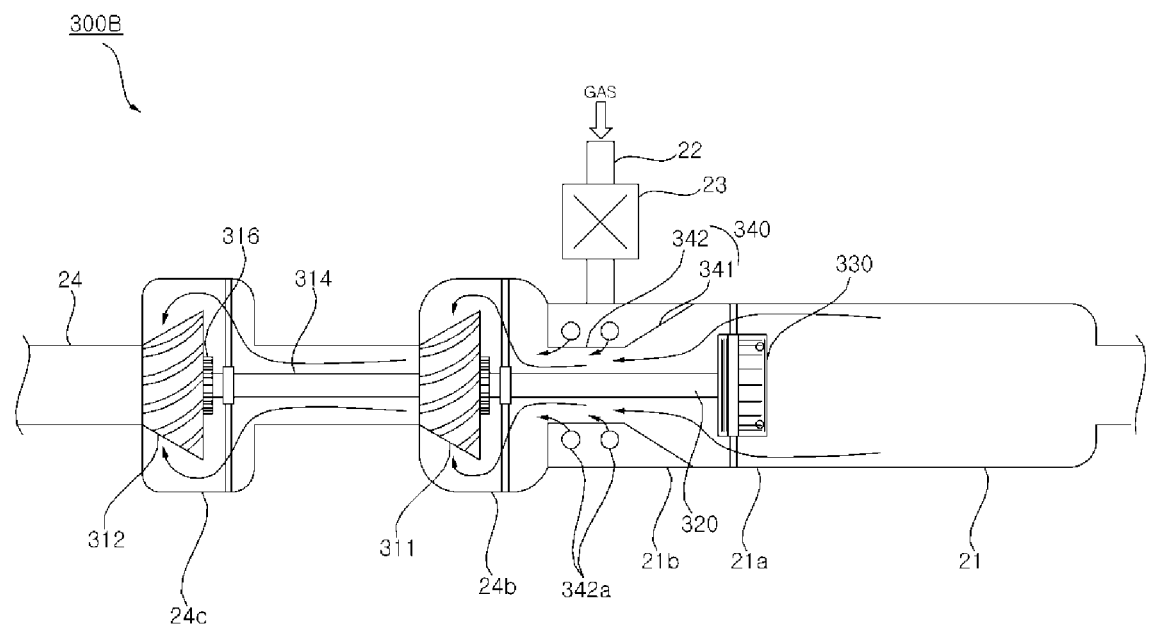
FIG. 7 is a diagram illustrating a part of a power generation unit according to another embodiment of the present invention.

FIG. 7 is a diagram illustrating a part of a power generation unit according to another embodiment of the present invention.

In comparison with the embodiment of FIG. 2, a compressor module 300B of another embodiment has a difference in that a plurality of compressor impellers 310 are provided. Hereinafter, it will be described with a focus on the difference from the embodiment of FIG. 2 and the configuration not specially described is regarded as the same as the embodiment of FIG. 2.

The plurality of compressor impellers 310 of another embodiment may be disposed in series. In detail, the compressor impeller 310 may include a first compressor impeller 311 and a second compressor impeller 312 connected to the motor 330 by the shaft 320.

The second compressor impeller 312 may be rotated together with or separately from the first compressor impeller 311. Specifically, the second compressor impeller 312 may be rotated by receiving the rotational force of the first compressor impeller 311.

Specifically, the embodiment may further include a clutch 316 connecting or disconnecting the power of the first compressor impeller 311 to the second compressor impeller 312. One side of the clutch 316 is contacted or non-contacted with the second compressor impeller 312, and the other end of the clutch 316 is fixed to a transmission shaft 314 connected to the first compressor impeller 311.

The first compressor impeller 311 is disposed closer to the motor 330 than the second compressor impeller 312, and the gas supply unit 340 is positioned between the first compressor impeller 311 and the motor 330.

The compressor impeller 310 may not be driven, only the first compressor impeller 311 may be driven, or the first compressor impeller 311 and the second compressor impeller 312 may be driven according to the required output of the engine. Therefore, the pressure of the mixed gas may be variously adjusted according to the engine output.

In addition, the compression ratio of the first compressor impeller 311 and the compression ratio of the second compressor impeller 312 may be different from each other or the same.

In this case, the impeller accommodating part 24a includes a first impeller accommodating part 24b for accommodating the first compressor impeller 311 and a second impeller accommodating part 24c for accommodating the second compressor impeller 312.

Figure 8:
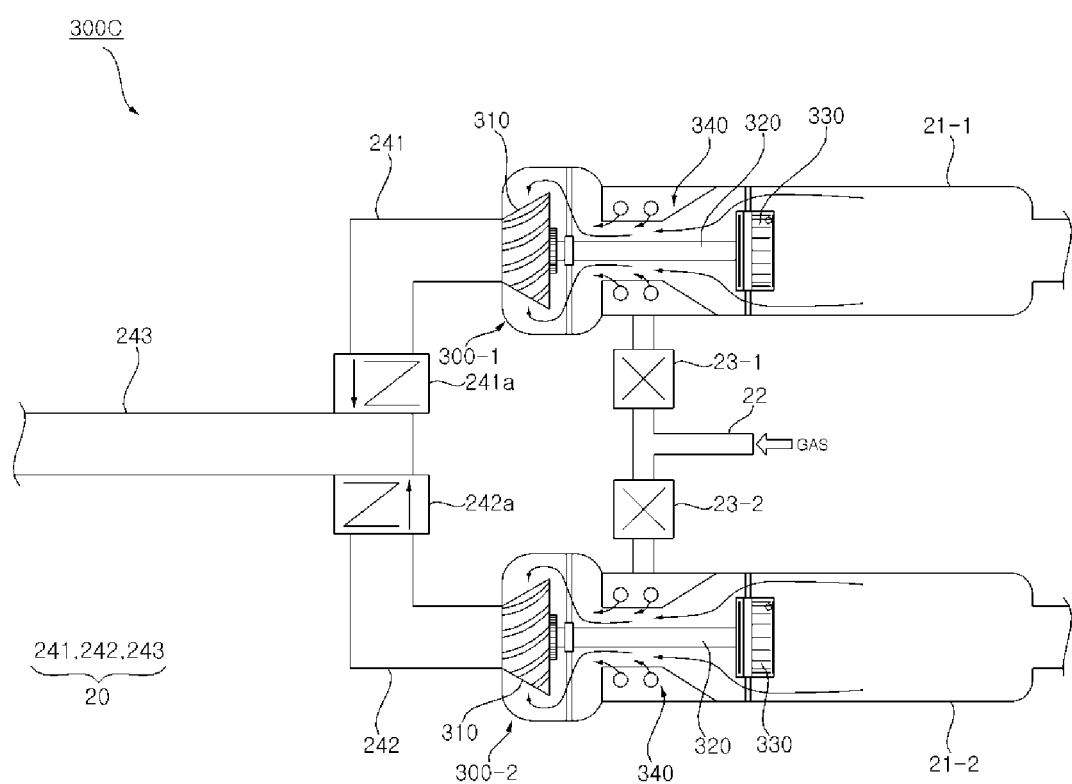
FIG. 8 is a diagram illustrating a part of a power generation unit according to another embodiment of the present invention.

FIG. 8 is a diagram illustrating a part of a power generation unit according to another embodiment of the present invention.

In comparison with the embodiment of FIG. 2, a compressor module 300C of another embodiment has a difference in that a plurality of compressor modules 300 are provided. Hereinafter, it will be described with a focus on the difference from the embodiment of FIG. 2 and the configuration not specially described is regarded as the same as the embodiment of FIG. 2.

A plurality of compressor modules 300 of another embodiment may be provided in parallel. Specifically, the compressor module 300 includes a first compressor module 300-1 and a second compressor module 300-2, the first compressor module 300-1 is connected to a first air intake pipe 21-1, and the second compressor module 300-2 is connected to a second air intake pipe 21-2. One end of the first air intake pipe 21-1 and one end of the second air intake pipe 21-2 are connected to the outside air. The gas intake pipe 22 is connected to the gas supply unit 340 of the first compressor module 300-1 and the second compressor module 300-2.

The first compressor module 300-1 and the second compressor module 300-2 are connected to the mixed gas intake pipe 24. The mixed gas intake pipe 24 may include a main pipe 243 having one end connected to the engine 14, a first branch pipe 241 having one end which is connected to the main pipe 243 and the other end which is connected to the first compressor module 300-1, and a second branch pipe 242 having one end which is connected to the main pipe 243 and the other end which is connected to the first compressor module 300-1. The first branch pipe 241 and the second branch pipe 242 may be provided with a check valve 241a, 242a to prevent the back flow of the mixed gas.

A single compressor module 300 is driven at a low engine load, and two compressor modules 300 are driven at a high load to improve the engine output. In consideration of the durability of the compressor module 300 according to the operation of each compressor module 300, the durability of the compressor module 300 can be improved through a sequential control based on the operating time, and normal operation can be achieved even in case of failure of a single compressor module 300. The first compressor module 300-1 and a compression ratio of the first compressor module 300-1 may be different from each other or the same.

According to the cogeneration system of the present invention, there are one or more of the following effects.

First, since the intake compressor for compressing the mixed gas is provided so that the mixed gas is compressed and supplied to the engine, the power generation output is improved and the efficiency is improved.

Second, since the mixed gas is compressed through the intake compressor in a state where air and gas are mixed, there is an advantage in that the power generation output is improved while stably supplying fuel without a separate fuel pressurization apparatus and a regulator.

Third, since the gas supply unit for supplying gas and the intake compressor for compressing the mixed gas are configured as a single module, there is an advantage of reducing the volume of the product and preventing leakage of the mixed gas.

Fourth, since a motor-type intake compressor is used and a plurality of impellers are connected in parallel or in series, there is an advantage in that precise compression ratio control can be achieved.

Fifth, by disposing the impeller in a place in which the mixed gas flows and by disposing the motor in a place in which the air flows, when the fuel smoothly introduced in the gas supply unit and a short circuit occurs in the electric line controlling the motor, there is an advantage of preventing the mixed gas from combusting Sixth, since the mixed gas is compressed through the intake compressor and then cooled again, there is an advantage of improving power generation efficiency by increasing the amount of fuel supplied to the engine, and preventing explosion of the mixed gas in case of leakage.

The effects of the present invention are not limited to the above-mentioned effects, and other effects not mentioned will be clearly understood by those skilled in the art from the description of the claims.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A cogeneration system, comprising:
an air intake pipe through which air is introduced;
a gas intake pipe into which gas is introduced;
a mixed gas intake pipe that supplies a mixed gas which is a mixture of air and gas to an engine; and
a compressor module which is connected to the air intake pipe, the gas intake pipe, and the mixed gas intake pipe, and mixes and compresses gas and air, wherein the compressor module comprises:
a compressor housing connected to the mixed gas intake pipe and the air intake pipe;
a motor disposed inside of the compressor housing;
at least one compressor impeller which is disposed inside of the compressor housing, and rotated by the motor to compress the mixed gas;

a shaft that connects the motor and the at least one compressor impeller; and a gas supply unit that supplies gas supplied from the gas intake pipe to the inside of the compressor housing, wherein the gas supply unit is disposed between the at least one compressor impeller and the motor, and wherein the gas supply unit comprises:

an acceleration unit that reduces a cross-sectional area of an air intake flow in a direction from the motor toward the at least one compressor impeller; and a spray unit having a smaller cross-sectional area than the cross-sectional area of the acceleration unit, and provided with at least one spray hole connected to the gas intake pipe.

2. The cogeneration system of claim 1, wherein the gas supply unit is disposed between the motor and the at least one compressor impeller in the air intake pipe.

3. The cogeneration system of claim 1, wherein the spray unit is disposed closer to the at least one compressor impeller than the acceleration unit.

4. The cogeneration system of claim 1, wherein the at least one compressor impeller comprises:

a first compressor impeller connected to the motor by the shaft;

a second compressor impeller; and a clutch that connects or disconnects power of the first compressor impeller to the second compressor impeller.

5. The cogeneration system of claim 1, wherein the motor is disposed upstream in an air flow direction of the gas supply unit, and wherein the gas supply unit is disposed upstream in the air flow direction of the at least one compressor impeller.

6. A cogeneration system, comprising:

an intake pipe, a first end of which communicates with outside air and a second end of which is connected to an engine;

a gas supply unit disposed in the intake pipe to supply gas into the intake pipe; and an intake compressor that compresses a mixed gas which is a mixture of the air and the gas, wherein the intake compressor comprises:

a motor disposed in the intake pipe; and at least one compressor impeller which is disposed in the intake pipe, and rotated by the motor to compress the mixed gas, wherein the gas supply unit is positioned between the motor and the at least one compressor impeller, and wherein the intake pipe comprises:

a motor accommodating part in which the motor is disposed;

a gas supply unit accommodating part in which the gas supply unit is disposed; and an impeller accommodating part in which the at least one compressor impeller is disposed.

7. The cogeneration system of claim 6, wherein the motor is disposed upstream of the gas supply unit.

8. The cogeneration system of claim 6, wherein the gas supply unit is disposed between the motor and the at least one compressor impeller in the intake pipe.

9. The cogeneration system of claim 6, wherein the gas supply unit accommodating part is positioned between the motor accommodating part and the impeller accommodating part.

10. The cogeneration system of claim 6, wherein the at least one compressor impeller comprises:

a first compressor impeller connected to the motor by a shaft;

a second compressor impeller; and a clutch that connects or disconnects power of the first compressor impeller to the second compressor impeller.

11. The cogeneration system of claim 6, further comprising a cooler that cools the mixed gas compressed in the intake compressor, wherein the cooler is positioned in the intake pipe between the engine and the compressor impeller.

12. The cogeneration system of claim 6, further comprising a generator that generates power by a power of the engine.

13. The cogeneration system of claim 6, further comprising a hot water storage tank that stores heat medium recovering heat generated by the engine.

14. The cogeneration system of claim 6, wherein the gas supply unit comprises:

an acceleration unit that reduces a cross-sectional area of an air intake flow in a direction from the motor toward the compressor impeller; and a spray unit having a smaller cross-sectional area than the acceleration unit, and provided with at least one spray hole connected to the gas intake pipe.

15. The cogeneration system of claim 14, wherein the spray unit is disposed closer to the at least one compressor impeller than the acceleration unit.

16. The cogeneration system of claim 14, further comprising a shaft that connects the motor and the at least one compressor impeller, wherein the spray unit and the acceleration unit surround the shaft.

17. The cogeneration system of claim 10, wherein the first compressor impeller is disposed closer to the motor than the second compressor impeller, and wherein the gas supply unit is positioned between the first compressor impeller and the motor.

* * * * *